(12) United States Patent
Sudou

(10) Patent No.: US 10,001,393 B2
(45) Date of Patent: Jun. 19, 2018

(54) METHOD FOR MAKING RESIN HOLLOW BODY AND FLOW MEASURING DEVICE

(71) Applicant: DENSO CORPORATION, Kariya, Aichi-pref. (JP)

(72) Inventor: Akiyuki Sudou, Takahama (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 14/696,705

(22) Filed: Apr. 27, 2015

(65) Prior Publication Data

US 2015/0308871 A1 Oct. 29, 2015

(30) Foreign Application Priority Data

Apr. 28, 2014 (JP) .................................. 2014-92228

(51) Int. Cl.
| | | |
|---|---|---|
| *G01F 1/68* | (2006.01) | |
| *G01F 1/684* | (2006.01) | |
| *B29D 22/00* | (2006.01) | |
| *G01F 15/00* | (2006.01) | |
| *G01F 15/14* | (2006.01) | |

(Continued)

(52) U.S. Cl.
CPC ............ *G01F 1/684* (2013.01); *B29C 65/542* (2013.01); *B29C 66/1312* (2013.01); *B29C 66/54* (2013.01); *B29C 66/83221* (2013.01); *B29D 22/00* (2013.01); *G01F 1/6842* (2013.01); *G01F 15/006* (2013.01); *G01F 15/14* (2013.01);

(Continued)

(58) Field of Classification Search
CPC ...... G01F 1/684; G01F 1/6842; G01F 15/006; G01F 15/14; B29C 65/542; B29C 66/1312; B29C 66/54; B29C 66/83221; B29D 22/00; B29L 2022/00; B29L 2031/3481; B29L 2031/7492
USPC ....................................................... 73/204.11
See application file for complete search history.

(56) References Cited

U.S. PATENT DOCUMENTS

| | | | | |
|---|---|---|---|---|
| 4,193,857 A | * | 3/1980 | Bannister .............. | C04B 35/119 204/426 |
| 6,782,744 B1 | * | 8/2004 | Tashiro ................. | F02D 41/187 73/204.22 |

(Continued)

FOREIGN PATENT DOCUMENTS

JP     2002-113785     4/2002

OTHER PUBLICATIONS

Sudou, U.S. Appl. No. 14/696,699, filed Apr. 27, 2015.
Sudou, U.S. Appl. No. 14/696,694, filed Apr. 27, 2015.

*Primary Examiner* — Max Noori
(74) *Attorney, Agent, or Firm* — Nixon & Vanderhye P.C.

(57) ABSTRACT

A metal mold includes a restraining part that is fitted in a recess provided at a part of surfaces of at least two resin parts that serves as an outer surface of a resin hollow body. A linear space is filled with high-pressure resin fluid injected at a predetermined injection pressure. The resin parts are joined together. The mold receives injection pressure of resin fluid, with which the space is filled, through the resin parts, and applies pressing force, which pushes back the resin parts toward the space, to the resin parts as reaction force against injection pressure. Stress is produced on a hollow wall surface in a direction in which the wall surface projects into a hollow portion due to injection pressure. The restraining part applies pressing force to the resin parts in a direction opposite from the stress projecting the wall surface into the hollow portion.

2 Claims, 4 Drawing Sheets

(51) Int. Cl.
*B29C 65/54* (2006.01)
*B29C 65/00* (2006.01)
B29L 31/00 (2006.01)
B29L 22/00 (2006.01)
B29L 31/34 (2006.01)

(52) U.S. Cl.
CPC ... *B29L 2022/00* (2013.01); *B29L 2031/3481* (2013.01); *B29L 2031/7492* (2013.01)

(56) References Cited

U.S. PATENT DOCUMENTS

| | | | | |
|---|---|---|---|---|
| 7,012,502 B2* | 3/2006 | Shibayama | ............... | G01K 7/22 338/229 |
| 2003/0214199 A1* | 11/2003 | Heim | ................... | F04B 35/045 310/309 |
| 2008/0184777 A1* | 8/2008 | Pernel | ................ | G01N 15/0826 73/38 |
| 2010/0251813 A1* | 10/2010 | Becker | ....................... | F16K 7/12 73/198 |
| 2012/0325011 A1* | 12/2012 | Takiguchi | ............. | G01F 1/6842 73/861 |
| 2015/0177038 A1* | 6/2015 | Tashiro | ................. | F02D 41/187 73/202.5 |

* cited by examiner

FLOW DIRECTION IN INTAKE PASSAGE

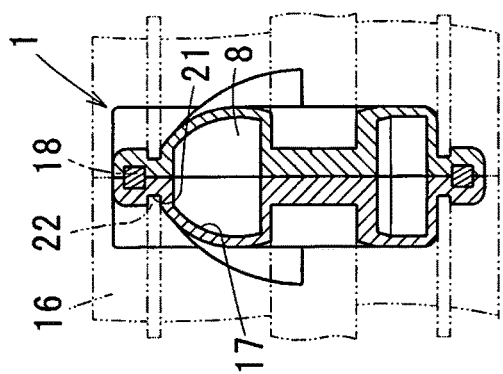
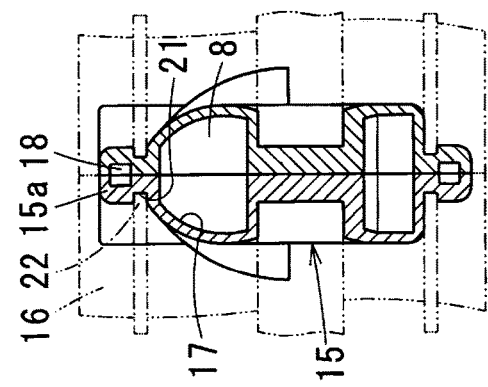
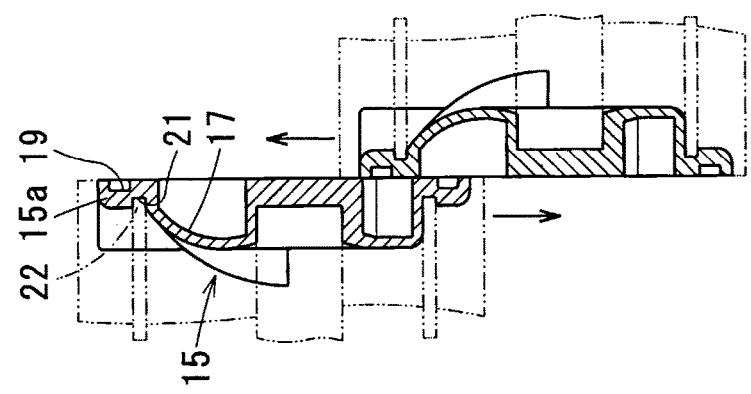
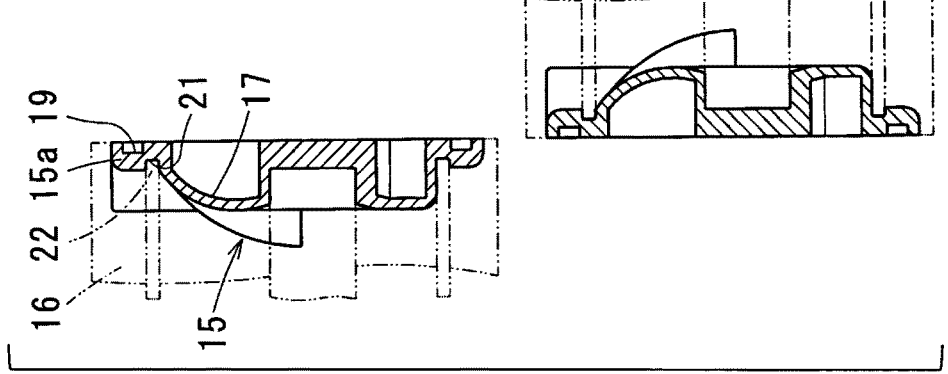

METHOD FOR MAKING RESIN HOLLOW BODY AND FLOW MEASURING DEVICE

CROSS REFERENCE TO RELATED APPLICATION

This application is based on Japanese Patent Application No. 2014-92228 filed on Apr. 28, 2014, the disclosure of which is incorporated herein by reference.

TECHNICAL FIELD

The present disclosure relates mainly to a method for making a resin hollow body. In particular, the present disclosure can be used for production of a housing of a flow measuring device that measures a flow rate of intake air drawn into an internal combustion engine (may hereinafter be referred to as an intake air amount).

BACKGROUND

Conventionally, for a flow measuring device that measures an intake air amount, for example, there is known a device that employs a thermal-type measuring method whereby a signal is produced in accordance with a flow rate by use of heat transfer between the device and air. The flow measuring device includes a housing and a sensor described as below. The housing is disposed to project into an intake passage leading to an internal combustion engine, and defines an internal passage which takes in a part of intake air flowing through the intake passage and through which the taken-in air passes. The sensor projects into the internal passage, and produces a signal according to the intake air amount by heat transfer between the sensor and the intake air passing through the internal passage.

The housing is a hollow body made of resin and having a hollow portion, and the hollow portion is used as the internal passage, and the shape of the hollow portion is unsuitable for a simple removal of a metal mold. For this reason, for example, after injection-molding at least two resin parts for forming the hollow portion, the two resin parts are joined together by an adhesive material or the like so as to provide the housing (the resin part for forming the hollow portion is hereinafter referred to as a half hollow body. In the following description, an example of formation of the hollow portion from two half hollow bodies will be explained).

Recently, as a more cost-advantageous mode of joining over joining by an adhesive material, there is proposed a mode in which two half hollow bodies are joined together by injection molding from resin fluid. Specifically, the two half hollow bodies are arranged in metal molds for injection molding, and joining edges of the two half hollow bodies are brought into abutment with each other in the metal molds so as to form a linear space separately from the hollow portion. Then, this linear space is filled up with the injected resin fluid, and the two half hollow bodies are joined together (the linear space filled up with the resin fluid is hereinafter referred to as a filled space).

When the joining by injection molding is employed, on a hollow wall surface that defines the hollow portion, stress is produced in a direction in which the hollow wall surface projects into the hollow portion due to injection pressure. Accordingly, the hollow wall surface is deformed to project by the injection pressure, so that the resin fluid may leak out. As described above, the shape of the hollow portion is unsuitable for a simple removal of a metal mold. Thus, the metal mold cannot be disposed in the hollow portion to prevent the projection of the hollow wall surface, and measures thereby need to be taken separately.

For a method for making the resin hollow body, there may be employed a method referred to as a die slide injection molding (abbreviated as DSI) method having an advantage in terms of cost and quality (see, e.g., JP2013-007705A). In case the DSI method is adopted, the method for making the resin hollow body is divided mainly into, for example, a forming process in which the two half hollow bodies are shaped by injection molding, and a joining process in which the two half hollow bodies are joined together. In the joining process, by relative displacement between the metal molds used in the forming process, without taking out the two half hollow bodies from the metal molds, the hollow wall surface is exposed, and the joining edges of the two half hollow bodies are brought into abutment with each other so as to form the hollow portion and the filled space. Then, the resin fluid is injected into the filled space and the joining edges are joined to each other.

As a result, the half hollow bodies, which have been injection-molded in the forming process, can be joined together promptly in the joining process before warping deformation or the like develops after the forming. Consequently, reduction of production man-hours, improvement of the joining part in quality and so forth can be achieved to ensure an advantage in terms of cost and quality. Therefore, a measure to restrict the projection of the hollow wall surface needs to be taken in order to employ the DSI method as the method for making the resin hollow body.

SUMMARY

The present disclosure addresses at least one of the above issues. Thus, it is an objective of the present disclosure to restrict projection of a hollow wall surface due to injection pressure of resin fluid for joining in a method for making a resin hollow body.

To achieve the objective of the present disclosure, there is provided a method for making a resin hollow body including a hollow portion, a linear space, a recess, and a hollow wall surface defining the hollow portion. According to the method, a joining process is performed. In the joining process, joining edges of at least two resin parts are brought into contact with one another so as to form the hollow portion and the linear space. The at least two resin parts are disposed in a predetermined metal mold in a state where the hollow portion and the linear space are formed. The metal mold includes a restraining part that is fitted in the recess provided at a part of surfaces of the at least two resin parts that serves as an outer surface of the resin hollow body. Furthermore, the linear space is filled up with high-pressure resin fluid which is injected at a predetermined injection pressure. In addition, the at least two resin parts are joined together. The metal mold receives the injection pressure of the resin fluid, with which the linear space is filled up, through the at least two resin parts, and applies pressing force, which pushes back the at least two resin parts toward the linear space, to the at least two resin parts as reaction force against the injection pressure. Stress is produced on the hollow wall surface in a direction in which the hollow wall surface projects into the hollow portion due to the injection pressure. The restraining part applies the pressing force to the at least two resin parts in a direction opposite from the stress projecting the hollow wall surface into the hollow portion.

Accordingly, transmission of the injection pressure to the hollow wall surface can be limited by the restraining part which is fitted in the recess at the time of injection molding in the joining process. As a result, the generation of inner wall projecting stress at the hollow wall surface can be restricted, and thus the projection of the hollow wall surface because of the injection pressure of resin fluid can be limited.

BRIEF DESCRIPTION OF THE DRAWINGS

The above and other objects, features and advantages of the present disclosure will become more apparent from the following detailed description made with reference to the accompanying drawings. In the drawings:

FIG. 4A is a diagram illustrating a state immediately after a forming process in a method for making a resin hollow body according to the embodiment;

FIG. 4B is a diagram illustrating that a mold is displaced in a joining process in the method for making the resin hollow body according to the embodiment;

FIG. 4C is a diagram illustrating completion of abutment in the joining process in the method for making the resin hollow body according to the embodiment; and FIG. 4D is a diagram illustrating a state immediately after filling with resin in the joining process in the method for making the resin hollow body according to the embodiment.

DETAILED DESCRIPTION

An embodiment will be described below. The embodiment illustrates a specific example, and it goes without saying that the present disclosure is not limited to the embodiment.

Figure 1:
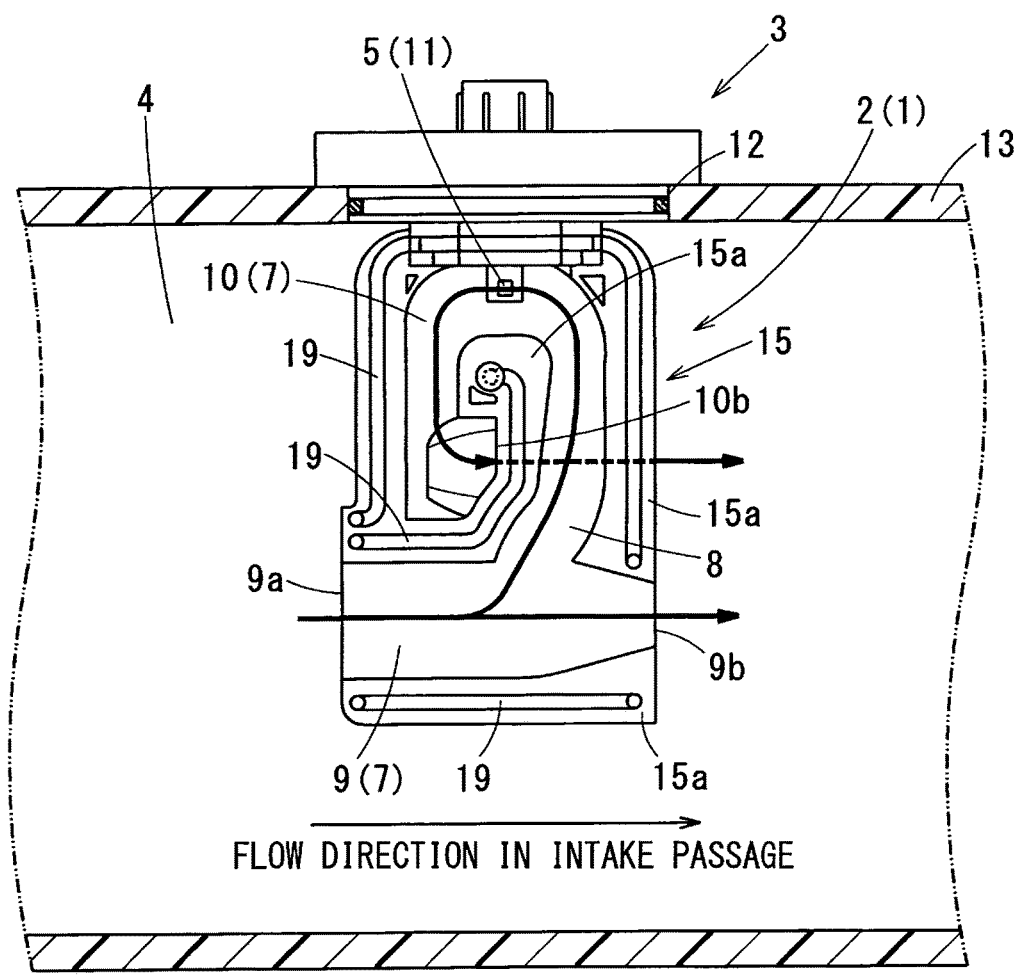
FIG. 1 is a diagram illustrating inside of a flow measuring device in accordance with an embodiment.
Figure 2A:
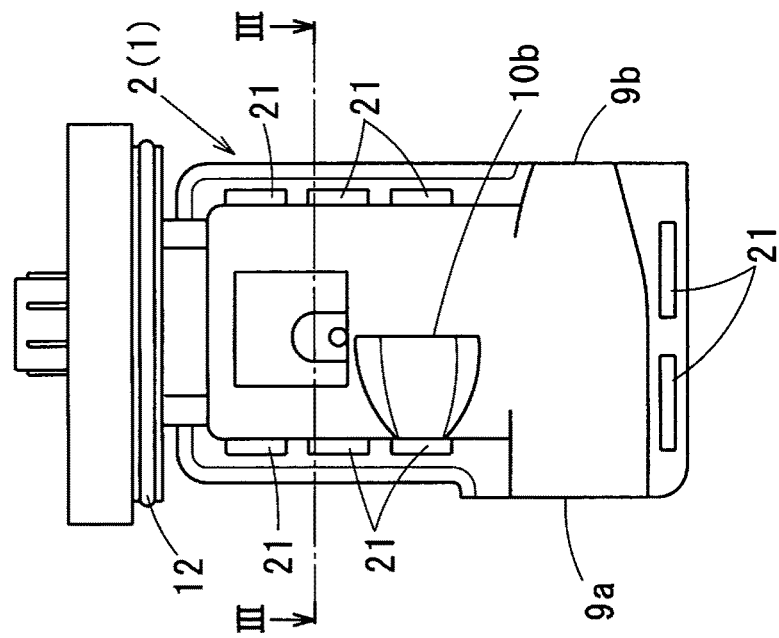
FIG. 2A is a rear view illustrating the flow measuring device of the embodiment.
Figure 2B:
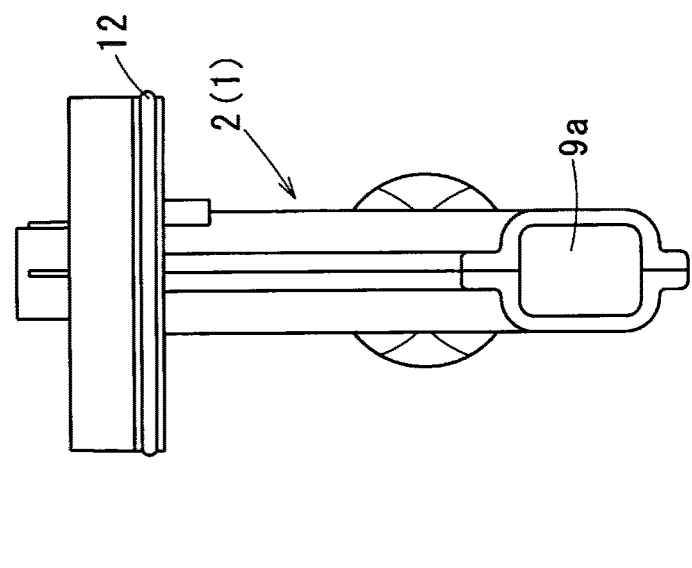
FIG. 2B is a side view illustrating the flow measuring device of the embodiment.

Configuration of a flow measuring device 3 with a resin hollow body 1 of the embodiment used as a housing 2 will be described with reference to FIGS. 1 to 2B and so forth. The flow measuring device 3 employs a thermal-type measuring method whereby to produce a signal in accordance with a flow rate of air by use of heat transfer between the device and air. For example, the flow measuring device 3 is disposed to project into an intake passage 4 leading to an internal combustion engine (not shown) to measure a flow rate (intake air amount) of intake air drawn into the engine, and produces a signal in accordance with the intake air amount. The signal produced by the flow measuring device 3 is outputted to an electronic control unit (ECU: not shown) provided separately from the flow measuring device 3, and is used for controlling operation of the engine as a signal indicating the intake air amount.

The flow measuring device 3 includes the housing 2 and a sensor 5 which will be described below. The housing 2 includes an internal passage 7 which takes in a part of intake air flowing through the intake passage 4 and through which this air passes, and is the resin hollow body 1 with a hollow portion 8 used as the internal passage 7. The sensor 5 is a thermal-type sensor that projects into the internal passage 7 and produces a signal in accordance with the intake air amount. In the resin hollow body 1, the hollow portion 8 is provided such that gas can flow into and out of the hollow portion 8, and accommodates the sensor 5.

The internal passage 7 mainly includes a first flow passage 9 that makes the taken-in intake air flow straight in the approximately same direction as a flow through the intake passage 4 and discharges this intake air, and a second flow passage 10 that separates a part of the flow of intake air from the first flow passage 9 to flow around and to discharge this intake air. The sensor 5 projects into the second flow passage 10 to produce a signal by heat transfer between the sensor 5 and the intake air passing through the second flow passage 10. Dust or the like contained in the taken-in intake air does not flow into the second flow passage 10 and proceeds through the first flow passage 9 due to its own inertia. Accordingly, damage to the sensor 5 from dust or the like is prevented.

An inlet port for intake air of the internal passage 7 (i.e., an inlet port 9a of the first flow passage 9) opens toward an upstream side in the intake passage 4 to take in a part of intake air flowing through the intake passage 4. A discharge port 9b of the first flow passage 9 opens toward a downstream side in the intake passage 4 to discharge the intake air together with the dust. Two divided discharge ports 10b of the second flow passage 10 are provided to position the discharge port 9b therebetween, and open toward an downstream side in the intake passage 4. Accordingly, the second flow passage 10 branches into two passages on a downstream side of the sensor 5.

The sensor 5 is integrated by resin with a processing circuit (not shown) that performs predetermined processing on the signal produced by the sensor 5 and outputs the processed signal, and a predetermined terminal (not shown) to constitute one assembly 11. The assembly 11 is attached to the housing 2, so that the sensor 5 is disposed to project into the internal passage 7. A conductively joining part between the terminal included in the assembly 11 and another terminal (not shown) is provided outside the intake passage 4, and is sealed by injection molding of resin fluid. The housing 2 is attached to a pipe 13 which defines the intake passage 4 with an O-ring 12 attached around the housing 2, and leakage of intake air is prevented by the O-ring 12.

Figure 3:
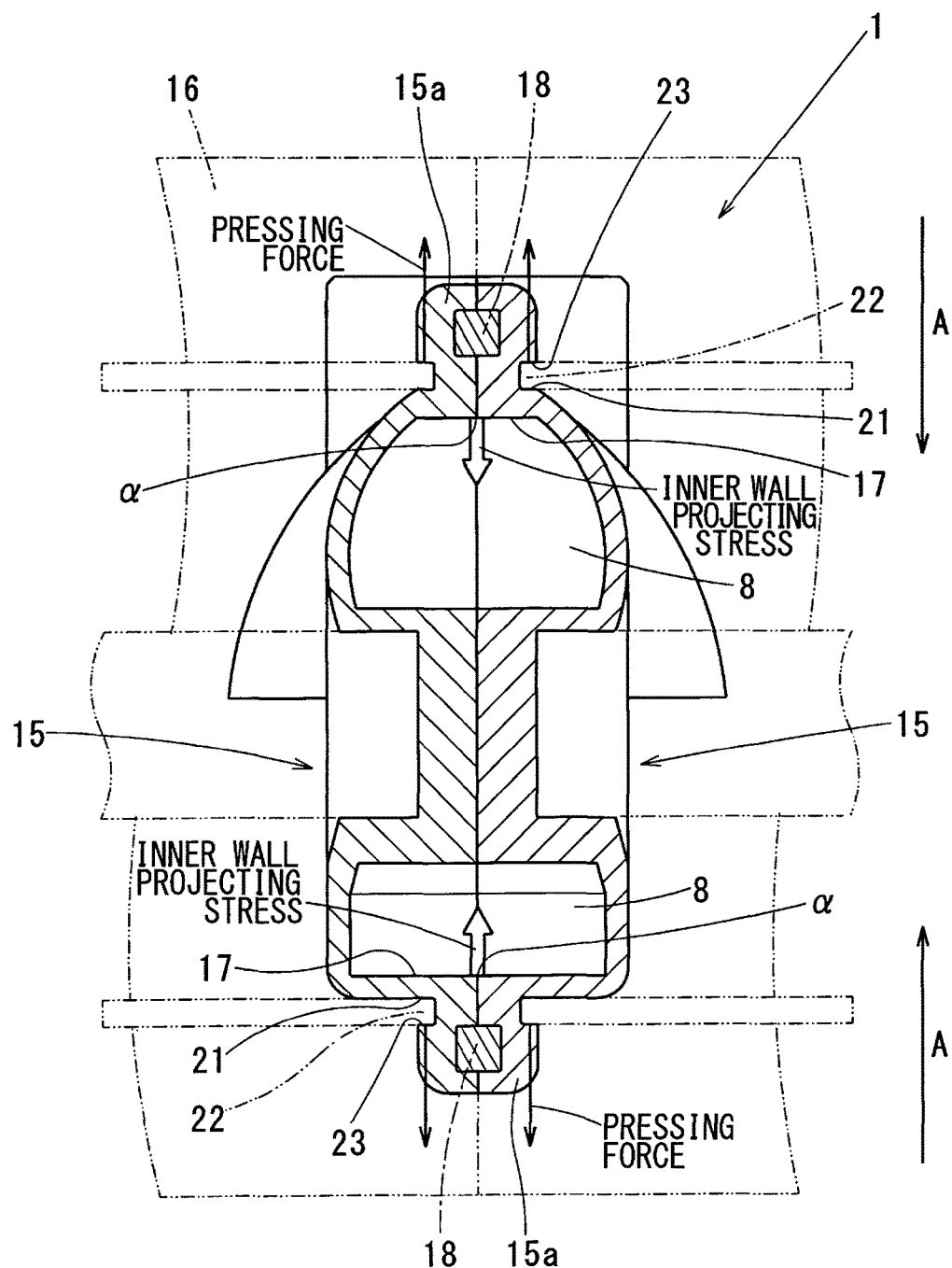
FIG. 3 is a cross-sectional view taken along a line in FIG. 2B.

A method for making the resin hollow body 1 will be described below with reference to FIGS. 3 to 4D and so forth. The resin hollow body 1 includes for example, the hollow portion 8 that is formed through a butt joint of two resin parts (half hollow bodies 15), and is provided with a "DSI method" as its production method. The DSI method mainly includes a forming process in which the two half hollow bodies 15 are shaped by injection molding, and a joining process in which the two half hollow bodies 15 are joined together.

First, in the forming process, cavities are formed by metal molds 16, and the resin fluid is injected into the cavities to fill up the cavities with the resin fluid. Accordingly, the two half hollow bodies 15 are formed simultaneously and separately (see FIG. 4A). Subsequently, in the joining process, by relative displacement between the metal molds 16 used in the forming process, without taking out the two half hollow bodies 15 from the metal molds 16, hollow wall surfaces 17 are exposed, and joining edges 15a of the two half hollow bodies 15 are brought into abutment with each other so as to form the hollow portions 8 and filled spaces 18. (see FIGS. 4B and 4C). Then, the filled spaces 18 are filled up with the resin fluid to join together the two half hollow bodies 15 (see FIG. 4D).

The filled space 18 is a linear space that is formed separately from the hollow portion 8 by butting the joining edges 15a of the two half hollow bodies 15 against each other, and is filled up with high-pressure resin fluid. The joining edge 15a is provided along the internal passage 7, and the filled space 18 is defined by linear grooves 19 provided respectively for the joining edges 15a (see FIG. 1). The two half hollow bodies 15 are provided symmetrically in a mirror-image. The surface on which the groove 19 is provided is a flat surface at each of the joining edges 15a, and the filled space 18 is formed by butting the flat surfaces on each other.

In the joining process, the metal molds 16 receive injection pressure of the resin fluid with which the filled spaces 18 are filled up, and apply pressing force, which pushes back the half hollow bodies 15 toward the filled spaces 18, to the half hollow bodies 15 as reaction force of the injection pressure. Stress (inner wall projecting stress) projecting the hollow wall surfaces 17 into the hollow portion 8 is produced by the injection pressure on the hollow wall surfaces 17 that define the hollow portion 8. Accordingly, the following structure is employed to limit the projection of the hollow wall surface 17 due to the inner wall projecting stress.

Recesses 21 are provided on a part of the surfaces of the half hollow bodies 15 that serves as an outer surface of the resin hollow body 1, and the metal mold 16 includes a restraining part 22 that is fitted in the recess 21. The restraining part 22 applies pressing force to the half hollow body 15 in a direction opposite from the inner wall projecting stress to restrain generation of the inner wall projecting stress by the pressing force and thereby to restrict the projection of the hollow wall surface 17.

The recess 21 is configured to be able to limit the projection of a position of the hollow wall surface 17 where the inner wall projecting stress is assumed to be easily made large. For example, at a position α of the hollow wall surface 17 where the butting between the joining edges 15a exists, the inner wall projecting stress is considered to be easily made large. Accordingly, the recesses 21 are configured to produce the pressing force in a direction opposite from the inner wall projecting stress generated at the position α.

For this reason, a restrained surface 23 having the following normal vector is included in the surfaces defining the recess 21. Specifically, the normal vector at the restrained surface 23 can be decomposed to include a vector component in a direction opposite from the inner wall projecting stress generated at the position α. Accordingly, as a result of the restraining part 22 being in contact with the restrained surface 23, the restraining part 22 can press the half hollow body 15 in a direction opposite from the inner wall projecting stress generated at the position α. In the embodiment, all the vector components of the normal vector at the restrained surface 23 are directed in the direction opposite from the inner wall projecting stress generated at the position α.

It may be desirable to restrain the half hollow body 15 by the restraining part 22 between the filled space 18 and the hollow portion 8. Thus, the recess 21 is provided between the filled space 18 and the hollow portion 8 in a direction A from the filled space 18 to the hollow portion 8 along the butting between the joining edges 15a.

Effects of the embodiment will be described below. By the method for making the resin hollow body 1 of the embodiment, in the joining process, the restraining part 22 of the metal mold 16 is fitted in the recess 21 which is provided on the outer surface of the resin hollow body 1, and the restraining part 22 applies the pressing force to the half hollow body 15 in a direction opposite from the inner wall projecting stress at the position α of the hollow wall surface 17. Accordingly, transmission of the injection pressure to the position α can be limited by the restraining part 22 which is fitted in the recess 21 at the time of injection molding in the joining process As a result, the generation of the inner wall projecting stress at the position α can be restricted, and thus the projection of the position α into the hollow portion 8 because of the injection pressure of resin fluid can be limited.

Modifications to the above embodiment will be described below. In the resin hollow body 1 of the embodiment, the recess 21 is provided between the filled space 18 and the hollow portion 8 in the direction A. However, the recess 21 may be provided at any position as long as the recess 21 can be provided to include the restrained surface 23. The recess 21 may be provided on an opposite side of the filled space 18 from the hollow portion 8 in the direction A. Moreover, the filled space 18 and the recess 21 may overlap in the direction A. Furthermore, in the resin hollow body 1 of the embodiment, the two half hollow bodies 15 are brought into contact with each other and joined together so as to form the hollow portions 8. Alternatively, three or more half hollow bodies 15 may be brought into contact and joined together so as to form the hollow portions 8. In addition, the resin hollow body 1 of the embodiment is provided by the DSI method, but the resin hollow body 1 may be provided by other manufacturing methods than the DSI method.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A flow measuring device comprising:
   a resin hollow body including a hollow portion, a linear space, a recess, and a hollow wall surface defining the hollow portion, wherein the resin hollow body is made by a joining process that includes:
   bringing joining edges of at least two resin parts into contact with one another so as to form the hollow portion and the linear space, wherein:
      the at least two resin parts are disposed in a predetermined metal mold in a state where the hollow portion and the linear space are formed; and
      the metal mold includes a restraining part that is fitted in the recess provided at a part of surfaces of the at least two resin parts which serves as an outer surface of the resin hollow body;
   filling up the linear space with high-pressure resin fluid which is injected at a predetermined injection pressure; and
   joining together the at least two resin parts, wherein:
      the metal mold receives the injection pressure of the resin fluid, with which the linear space is filled up, through the at least two resin parts, and applies pressing force, which pushes back the at least two resin parts toward the linear space, to the at least two resin parts as reaction force against the injection pressure;

stress is produced on the hollow wall surface in a direction in which the hollow wall surface projects into the hollow portion due to the injection pressure; and the restraining part applies the pressing force to the at least two resin parts in a direction opposite from the stress projecting the hollow wall surface into the hollow portion; and a sensor that is accommodated in the hollow portion to produce a signal in accordance with a flow rate of gas passing through the hollow portion, wherein the hollow portion is provided to allow flows of gas into and out of the hollow portion.

2. An intermediate assembly of a flow measuring device comprising:

a resin hollow body including a hollow portion configured to allow flows of gas into and out of the hollow portion, a linear space, a recess, and a hollow wall surface defining the hollow portion, wherein the resin hollow body includes at least two resin parts, wherein joining edges of the at least two resin parts are in contact with one another so as to form the hollow portion and the linear space, the at least two resin parts are disposed in a predetermined metal mold in a state where the hollow portion and the linear space are formed, and the metal mold includes a restraining part that is fitted in the recess provided at a part of surfaces of the at least two resin parts which serves as an outer surface of the resin hollow body;

the linear space is filled with high-pressure resin fluid which is injected at a predetermined injection pressure; and the metal mold receives the injection pressure of the resin fluid, with which the linear space is filled up, through the at least two resin parts, and applies pressing force, which pushes back the at least two resin parts toward the linear space, to the at least two resin parts as reaction force against the injection pressure;

stress is produced on the hollow wall surface in a direction in which the hollow wall surface projects into the hollow portion due to the injection pressure; and the restraining part applies the pressing force to the at least two resin parts in a direction opposite from the stress projecting the hollow wall surface into the hollow portion; and a sensor that is configured to be accommodated in the hollow portion to produce a signal in accordance with a flow rate of gas passing through the hollow portion.

\* \* \* \* \*